(12) United States Patent
Tang

(10) Patent No.: US 11,831,784 B2
(45) Date of Patent: *Nov. 28, 2023

(54) SYSTEMS AND METHODS FOR SECURE DATA TRANSMISSION

(71) Applicant: YUNDING NETWORK TECHNOLOGY (BEIJING) CO., LTD., Beijing (CN)

(72) Inventor: Hao Tang, Beijing (CN)

(73) Assignee: YUNDING NETWORK TECHNOLOGY (BEIJING) CO., LTD., Beijing (CN)

( * ) Notice: Subject to any disclaimer, the term of this patent is extended or adjusted under 35 U.S.C. 154(b) by 36 days.

This patent is subject to a terminal disclaimer.

(21) Appl. No.: 17/663,659

(22) Filed: May 16, 2022

(65) Prior Publication Data

US 2022/0278850 A1 Sep. 1, 2022

Related U.S. Application Data

(63) Continuation of application No. 16/713,707, filed on Dec. 13, 2019, now Pat. No. 11,362,838, which is a
(Continued)

(30) Foreign Application Priority Data

Jun. 14, 2017 (CN) .......................... 201710449197.0

(51) Int. Cl.
*H04L 9/00* (2022.01)
*H04L 9/32* (2006.01)
(Continued)

(52) U.S. Cl.
CPC ........ *H04L 9/3247* (2013.01); *G06F 11/1004* (2013.01); *H04L 9/0625* (2013.01);
(Continued)

(58) Field of Classification Search
CPC ... H04L 9/3247; H04L 9/0625; H04L 9/0631; H04L 9/0869; H04L 9/3231;
(Continued)

(56) References Cited

U.S. PATENT DOCUMENTS 8,316,235 B2 * 11/2012 Boehl ................... H04L 9/0662
713/168
2010/0205448 A1 8/2010 Tarhan et al.
(Continued)

FOREIGN PATENT DOCUMENTS

CN 102624515 A 8/2012
CN 102662874 A 9/2012
(Continued)

OTHER PUBLICATIONS

International Search Report in PCT/CN2018/084587 dated Jun. 29, 2018, 6 pages.
(Continued)

*Primary Examiner* — Izunna Okeke
(74) *Attorney, Agent, or Firm* — METIS IP LLC

(57) ABSTRACT

The present disclosure relates to systems and methods for transmitting data. The methods may include obtaining, by a first module, a first packet, wherein the first packet includes a first random code, first data, and a first signature, wherein the first signature is generated by a second module by encryption based on an original random code and original data; generating, by the first module a second signature by encryption based on the first random code and a checksum of the first data; and generating, by the first module, a first response to the first packet upon determining whether the second signature matches the first signature.

18 Claims, 6 Drawing Sheets

Related U.S. Application Data continuation of application No. PCT/CN2018/084587, filed on Apr. 26, 2018.

(51) Int. Cl.
- *G06F 11/10* (2006.01)
- *H04L 9/06* (2006.01)
- *H04L 9/08* (2006.01)
- *H04L 9/40* (2022.01)

(52) U.S. Cl.
CPC .......... *H04L 9/0631* (2013.01); *H04L 9/0869* (2013.01); *H04L 9/3231* (2013.01); *H04L 63/0861* (2013.01); *H04L 63/12* (2013.01)

(58) Field of Classification Search
CPC ... H04L 63/0861; H04L 63/12; H04L 9/0866; H04L 9/3236; H04L 9/0822; G06F 11/1004
See application file for complete search history.

(56) References Cited

U.S. PATENT DOCUMENTS

| | | |
|---|---|---|
| 2011/0231666 A1 | 9/2011 | Guenther |
| 2015/0149779 A1* | 5/2015 | Falk .................. H04L 9/0866 713/171 |
| 2017/0244564 A1 | 8/2017 | Näslund et al. |
| 2020/0119927 A1 | 4/2020 | Tang |

FOREIGN PATENT DOCUMENTS

| | | |
|---|---|---|
| CN | 104050431 A | 9/2014 |
| CN | 104104499 A | 10/2014 |

OTHER PUBLICATIONS

Written Opinion in PCT/CN2018/084587 dated Jun. 29, 2018, 10 pages.

First Office Action in Chinese Application No. 201710449197.0 dated Oct. 30, 2019, 21 pages.

* cited by examiner

SYSTEMS AND METHODS FOR SECURE DATA TRANSMISSION

CROSS-REFERENCE TO RELATED APPLICATIONS

This application a continuation of U.S. patent application Ser. No. 16/713,707, filed Dec. 13, 2019, which is a continuation of International Application No. PCT/CN2018/084587, filed on Apr. 26, 2018, which claims priority of Chinese Application No. 201710449197.0, filed on Jun. 14, 2017, the contents of which are incorporated herein by reference.

TECHNICAL FIELD

The present disclosure generally relates to systems and methods for transmitting data.

BACKGROUND

Existing data transmission between a verification data capturing device and a controller thereof usually brings some problems. For example, the controller has weak performance and cannot perform complex encryption algorithms, such as an RSA algorithm, a data encryption standard (DES) algorithm, a message-digest (MD5) algorithm, etc. Data between the verification data capturing device and the controller is often transmitted using plaintext, which makes the data transmission vulnerable to a security risk. Thus, it is desirable to provide systems and methods for transmitting data to realize safe communications between the verification data capturing device and the controller at low hardware costs.

SUMMARY

An aspect of the present disclosure introduces a system. The system may include at least one storage device including a set of instructions for transmitting data, and at least one processor in communication with the storage device. When executing the set of instructions, the at least one processor may cause the system to perform the operations including: obtaining, by a first module, a first packet, wherein the first packet includes a first random code, first data, and a first signature, wherein the first signature is generated by a second module by encryption based on an original random code and original data; generating, by the first module, a second signature by encryption based on the first random code and a checksum of the first data; and generating, by the first module, a first response to the first packet upon determining whether the second signature matches the first signature.

In some embodiments, the first module includes a verification data capturing device configured to capture verification data, the second module includes a controller configured to generate and send the first packet to the verification data capturing device, the first packet includes a command packet, and the first data includes command data.

In some embodiments, the generating a first response to the first packet upon determining whether the second signature matches the first signature includes: in response to determining that the second signature matches the first signature, generating a response packet including a second random code, response data, and a third signature, wherein the third signature is generated by encryption based on the second random code and a checksum of the response data.

In some embodiments, the first module includes a controller configured to verify the first packet from the second module, the second module includes a verification data capturing device configured to capture verification data and generate and send the first packet to the controller, the first packet includes a response packet, and the first data includes response data.

In some embodiments, the first random code is generated based on a command packet associated with the response packet.

In some embodiments, before obtaining the first packet, the at least one processor is further directed to cause the system to perform the operations including: generating, by the controller, the command packet including a third random code, command data, and a fourth signature; transmitting the command packet to the verification data capturing device; and obtaining, by the controller, a second response from the verification data capturing device, wherein the second response is generated by the verification data capturing device upon determining whether a fifth signature matches the fourth signature, and the fifth signature is generated by the verification data capturing device by encryption based on the command data and the third random code.

In some embodiments, the first random code is a host random code generated by a controller, and the at least one processor is further directed to cause the system to perform the operations including: determining, by the first module, a random key based on the host random code and a verification random code generated by a verification data capturing device; generating, by the first module, an encrypted message of the first packet by encryption based on the first data and the host random code; and sending, by the first module, the random key and the encrypted message to the second module.

In some embodiments, the at least one processor is further directed to cause the system to perform the operations including: obtaining from the second module a third response to the first packet, wherein the third response is generated by the second module upon determining whether a decrypted message matches the first data in the first packet, and the decrypted message is generated by decryption based on the encrypted message, the random key, and the verification random code.

According to another aspect of the present disclosure, a method is provided. The method may include generating, by a first module, a first packet including first data; determining, by the first module, a random key based on a host random code of a controller and a verification random code of a verification data capturing device; encrypting, by the first module, the first data utilizing the host random code to generate an encrypted message; transmitting the random key and the encrypted message to a second module; determining, by the second module, the host random code based on the obtained random key and the verification random code; decrypting, by the second module, the encrypted message utilizing the host random code to obtain second data; and generating, by the second module, a first response upon comparing the first data with the second data.

In some embodiments, the determining a random key includes: performing a logic operation on the host random code and the verification random code to obtain a logic operation result; and encrypting the logic operation result by an Advanced Encryption Standard (AES) encryption to obtain the random key.

In some embodiments, the logic operation includes an exclusive or operation.

In some embodiments, the determining the host random code include: decrypting the random key by an Advanced Encryption Standard (AES) encryption to obtain a logic operation result of the host random code and the verification random code; and determining the host random code based on the logic operation result and the verification random code.

In some embodiments, the method further includes: initializing the verification data capturing device to obtain the verification random code.

In some embodiments, the verification data capturing device includes a biometric data capturing device.

According to another aspect of the present disclosure, a controller is provided. The controller may include a random code generator configured to generate a host random code; and a controlling chip configured to: generate a packet including unencrypted data; obtain a verification random code; determine a random key based on the host random code and the verification random code; encrypt the unencrypted data utilizing the host random code to generate an encrypted message; and transmit the encrypted message and the random key.

According to another aspect of the present disclosure, a verification data capturing device is provided. The verification data capturing device may include a sensor configured to capture data for verifying authentication of a user; a random code generator configured to generate a verification random code; and a verification chip configured to: obtain an encrypted message, wherein the encrypted message is obtained by encrypting first data; obtain a random key; determine a host random code based on the random key and the verification random code; decrypt the encrypted message utilizing the host random code to obtain second data; generate a response upon comparing the first data and the second data; and transmit the response.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
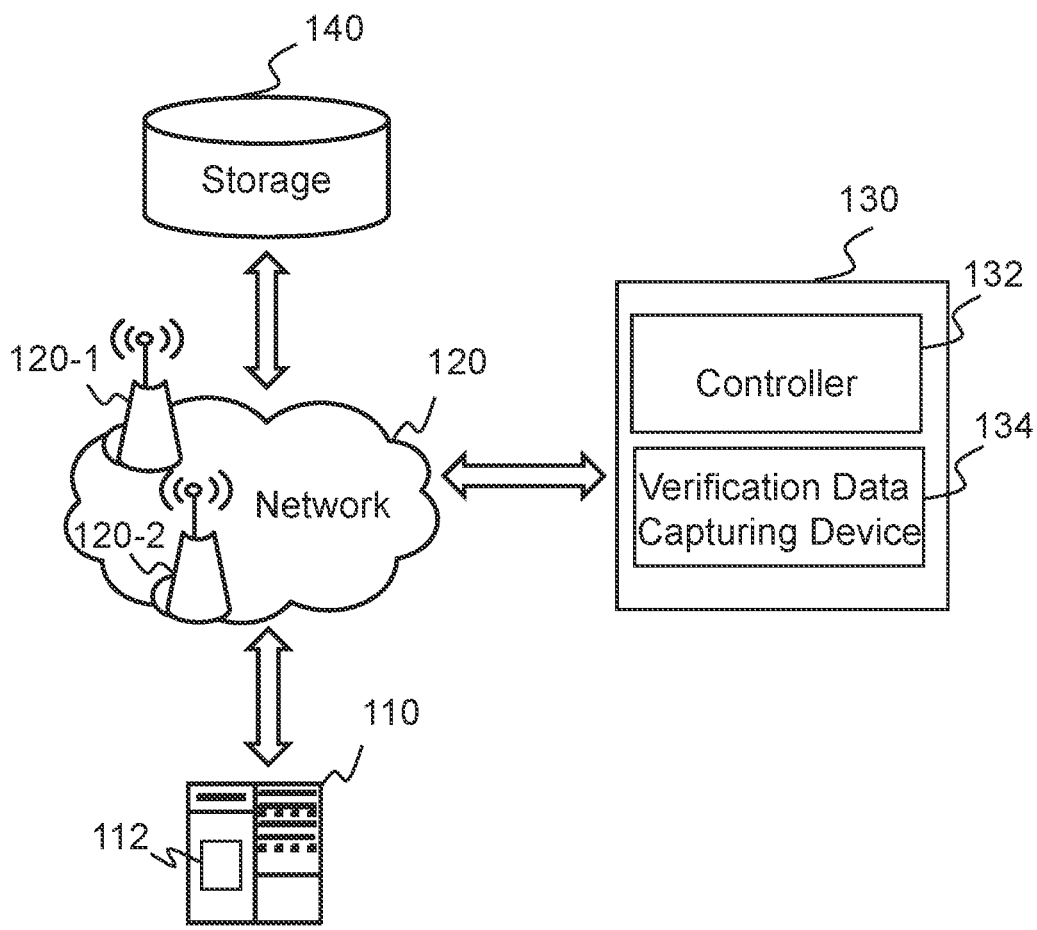
FIG. 1 is a schematic diagram illustrating an exemplary system for transmitting data according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for transmitting data. To this end, the systems and methods may generate a first signature at a sending terminal when sending original data. The first signature is generated by encrypting an original random code generated by the sending terminal and a checksum of the original data. An original packet including the original data, the original random code, and the first signature may be transmitted to a receiving terminal. During the transmission, the original data and the original random code in the original packet may be tampered or fabricated. The systems and methods may generate a second signature by encrypting obtained data and an obtained random code in an obtained packet obtained from the sending terminal or a sending device where the original data or the original random code is tampered or fabricated. If the original data and/or the original random code in the original packet is tampered or fabricated during transmission, the first signature may mismatch the second signature. The systems and methods may generate a response to the original packet at the receiving terminal upon determining whether the first signature matches the second signature. As used herein, that two data sets match, e.g., the first signature matching the second signature, indicates that the two data sets satisfy a matching condition. Exemplary matching conditions may include that two data sets are identical, that two data sets are complementary to each other, two data sets have a certain degree of similarity, etc. As used herein, that two data sets mismatch, e.g., the first signature mismatching the second signature, indicates that the two data sets fail to satisfy such a matching condition. In this way, the sending terminal and the receiving terminal may need to be equipped with only an encryption module, instead of both an encryption module and a decryption module, to realize safe communications at low hardware costs.

In addition, the systems and methods may generate a random code at the sending terminal and the receiving terminal, respectively. The systems and methods may generate a random key by performing, at the sending terminal, a logic operation on the two random codes, and encrypt, also at the sending terminal, the original data with a random code generated by the sending terminal. The random key together with the encrypted data may be transmitted to the receiving terminal. At the receiving terminal, the random code generated by the sending terminal may be deciphered based on the random key and a random code generated by the receiving terminal. The systems and methods may decrypt, at the receiving terminal, the encrypted data based on the random code generated by the sending terminal. If the data sending from the sending terminal is tampered or fabricated, the decrypted data may mismatch the original data. The systems and methods may generate a response at the receiving terminal upon determining whether the decrypted data matches the original data. In this way, safe communications between the sending terminal and the receiving terminal may be realized.

FIG. 1 is a schematic diagram of an exemplary system 100 for transmitting data according to some embodiments of the present disclosure. The system 100 may include a server 110, a network 120, an authorization device 130, and storage 140.

The server 110 may be configured to process information and/or data relating to data transmission. For example, the server 110 may determine a data transmission protocol for the authorization device 130. As another example, the server 110 may send the data transmission protocol to the authorization device 130, and store the data transmission protocol in the authorization device 130. As still another example, the server 110 may send the data transmission protocol to the authorization device 130 in real-time via the network 120. In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the authorization device 130, and/or the storage 140 via the network 120. As another example, the server 110 may be operably connected the authorization device 130, and/or the storage 140 to access stored information and/or data. In some embodiments, the server 110 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof. In some embodiments, the server 110 may be implemented on one or more computing devices each of which has one or more components such as a bus, a processor, a read-only memory (ROM), a random access memory (RAM), a COM port, an I/O component, a disk, or the like, or any combination thereof.

In some embodiments, the server 110 may include a processing device 112. The processing device 112 may process information and/or data relating to data transmission. For example, the processing device 112 may determine a data transmission protocol for the authorization device 130. In some embodiments, the processing device 112 may include one or more processing engines (e.g., single-core processing engine(s) or multi-core processor(s)). Merely by way of example, the processing device 112 may be one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor, or the like, or any combination thereof.

The network 120 may facilitate the exchange of information and/or data. In some embodiments, one or more components of the system 100 (e.g., the server 110, the authorization device 130, and the storage 140) may transmit information and/or data to other component(s) in the system 100 via the network 120. For example, the server 110 may obtain data sent from the authorization device 130 via the network 120. As another example, the server 110 may obtain transmission protocols from the storage 140 via the network 120. In some embodiments, the network 120 may be any type of wired or wireless network, or combination thereof. Merely by way of example, the network 120 may be a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the system 100 may be connected to the network 120 to exchange data and/or information between them.

The authorization device 130 may be any electronic device that is capable of verifying the identity of a user. For example, the authorization device 130 may include a lock, a smart device, an access control device, or the like, or any combination thereof. In some embodiments, the smart device may include a mobile phone, a computer, a smart household appliance, a smart wearable device, or the like or any combination thereof. In some embodiments, the authorization device 130 may include a controller 132 and a verification data capturing device 134. In some embodiments, the controller 132 may be configured to control the verification data capturing device 134. For example, the controller 132 may generate and send a command to the verification data capturing device 134, e.g., to turn it on or off, turn it from an active mode to a standby or sleep mode, or vice versa. As another example, the controller 132 may verify data acquired by the verification data capturing device 134, and respond to the verification data capturing device 134. In some embodiments, the controller 132 may include a chip, a microprogrammed control unit (MCU), a single-chip microcomputer, a microprocessor, or the like, or any combination thereof. In some embodiments, the controller 132 may be electrically connected to the verification data capturing device 134. For example, the controller 132 may be operably connected to the verification data capturing device 134 via a wireless network.

In some embodiments, the verification data capturing device 134 be any electronic device that is capable of capturing verification data of a user. For example, the verification data capturing device 134 may include a biometric data capturing device, an input device, or the like, or any combination thereof. In some embodiments, the biometric data capturing device may capture biometric data of a subject, e.g., a human. For example, the biometric data capturing device may include a fingerprint capturing device, a voice capturing device, a retina capturing device, an iris capturing device, a face capturing device, a vein capturing device, a palm print capturing device, or the like, or any combination thereof. In some embodiments, the input device may capture any types of verification data. For example, the input device may be a keyboard, a mouse, an image scanner, a bar code reader, a physical button, a touch screen, a camera, or the like, or any combination thereof. In some embodiments, the verification data capturing device 134 may be configured to verify a command from the controller 132 and respond to the command. In some embodiments, the verification data capturing device 134 may be configured to generate a request encoding the verification information of a user and send the request to the controller 132. In some embodiments, the controller 132 and the verification data capturing device 134 may be integrated into the authorization device 130.

In some embodiments, the controller 132 and the verification data capturing device 134 may be two separate parts. In some embodiments, the controller 132 may be operably connected to different verification data capturing devices. Merely by way of example, a controller 132 may be paired with different types of verification data capturing devices manufactured by a same or different manufacturers or a same type of verification data capturing devices manufactured by a same or different manufacturers. In some embodiments, a verification data capturing device 134 may be paired with different controllers. Merely by way of example, a verification data capturing device 134 may be paired with different types of controllers manufactured by a same or different manufacturers or a same type of controllers manufactured by a same or different manufacturers. The pairing between a controller 132 and a verification data capturing device 134 may be performed via a wired connection (e.g., using a cable via a Universal Serial Bus (USB) port, a USB-C port, a serial peripheral interface (SPI), a universal asynchronous receiver/transmitter (UART), etc.) or a wireless connection (e.g., wireless personal area networks (WPANs), wireless local area network (WLAN), wireless ad hoc network, wireless metropolitan area networks (MAN), wireless wide area networks (WAN), etc.). The controller 132 may be configured such that such a pairing may be established only when a certain security measure is performed. Exemplary security measures may include verifying an authentication code, verifying an identity, etc. For instance, an authentication code may be a one-time authentication code generated by a recognized device, application, or account, or generated upon request by the server 110 and sent to a recognized device, application, or account in a text message, email, etc. As another example, the identity may be unique verification information of a recognized device, application, or account.

The storage 140 may store data and/or instructions. For example, the storage 140 may store data obtained from the authorization device 130 (e.g., fingerprints or images). As another example, the storage 140 may store data and/or instructions that the server 110 may execute or use to perform exemplary methods described in the present disclosure. In some embodiments, the storage 140 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage 140 may include at least one network port to communicate with other devices in the system 100. For example, the storage 140 may be connected to the network 120 to communicate with one or more components of the system 100 (e.g., the server 110, the authorization device 130) via the at least one network port. One or more components in the system 100 may access the data or instructions stored in the storage 140 via the network 120. In some embodiments, the storage 140 may be directly connected to or communicate with one or more components in the system 100 (e.g., the server 110, the authorization device 130). In some embodiments, the storage 140 may be part of the server 110.

Figure 2:
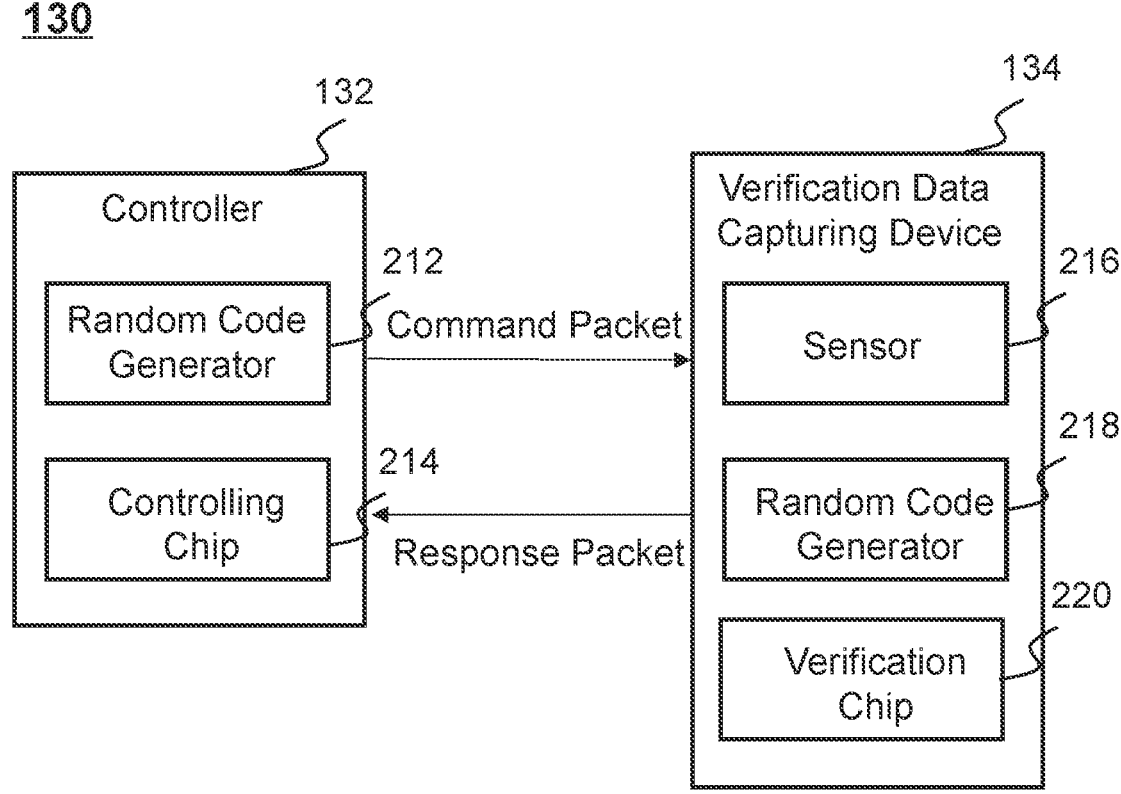
FIG. 2 is a schematic diagram illustrating an exemplary authorization device according to some embodiments of the present disclosure.

FIG. 2 is a schematic diagram illustrating an exemplary authorization device 130 according to some embodiments of the present disclosure. As illustrated in FIG. 2, the authorization device may include the controller 132 and the verification data capturing device 134. The controller 132 may include a random code generator 212 and a controlling chip 214. The verification data capturing device 134 may include a sensor 216, a random code generator 218, and a verification chip 220.

In some embodiments, the random code generator 212 may be configured to generate a host random code. For example, the random code generator 212 may include a random number generator. The host random code may include a random number. In some embodiments, the controlling chip 214 may be configured to control the verification data capturing device 134. For example, the controlling chip 214 may generate and send a command (e.g., a command packet) to the verification data capturing device 134. As another example, the controlling chip 214 may verify data sent from the verification data capturing device 134, and respond to the verification data capturing device 134.

In some embodiments, the sensor 216 may be configured to capture verification data of a user. For example, the sensor 216 may capture a fingerprint, a voice or audio signal, a retina image, an iris image, a face image, a vein image, a palm print, an image, a bar code, a QR code, a number, a word, or the like, or any combination thereof. In some embodiments, the random code generator 218 be configured to generate a verification random code. For example, the random code generator 218 may include a random number generator. The verification random code may include a random number. In some embodiments, the verification chip 220 may be configured to verify a command from the controller 132 and send a response (e.g., a response packet) to the command. In some embodiments, the verification chip 220 may be configured to generate a request encoding the verification information of a user and send the request to the controller 132.

In some embodiments, the controller 132 and the verification data capturing device 134 may pre-store an encryption key, respectively. If a controller 132 is operably connected to a verification data capturing device 134, the controller 132 and the verification data capturing device 134 may have a complementary or same encryption key. For example, the encryption key may be generated by the controller 132 and sent to the verification data capturing device 134 as part of the factory settings. In order to improve the security of data transmissions, the encryption key stored in the verification data capturing device 134 may be fixed and cannot be updated except through an enhanced authentication process, e.g., when the verification data capturing device 134 restores to factory settings.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other units may be added in the controller 132 or the verification data capturing device 134. For example, the controller 132 may include a command packet generating unit, a signature generating unit, a command packet sending unit, a response packet obtaining unit, a response packet generating unit, a response packet sending unit, or the like, or any combination thereof, to perform various operations. As another example, the verification data capturing device 134 may include a signature generating unit, a response packet obtaining unit, a response packet generating unit, a response packet sending unit, or the like, or any combination thereof, to perform various operations.

Figure 3:
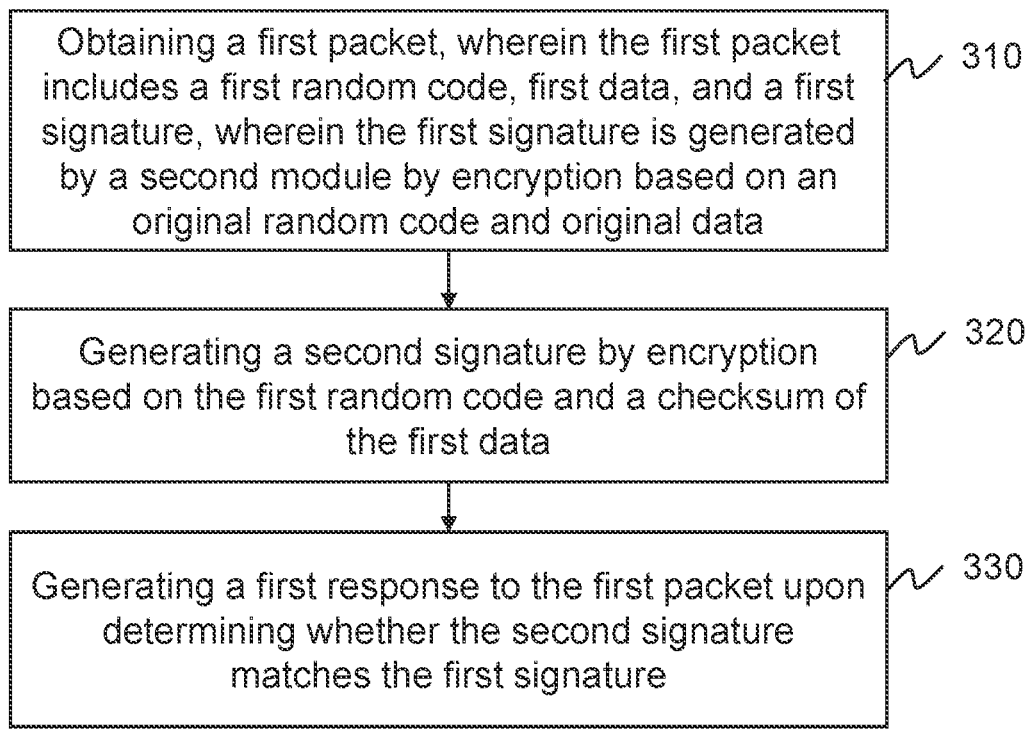
FIG. 3 is a flowchart illustrating an exemplary process for transmitting data according to some embodiments of the present disclosure.

FIG. 3 is a flowchart illustrating an exemplary process 300 for transmitting data according to some embodiments of the present disclosure. In some embodiments, the process 300 may be executed by the system 100. For example, the process 300 may be implemented as a set of instructions (e.g., an application) stored in a storage of the system 100 (e.g., the storage 140). The system 100 may execute the set of instructions, and when executing the instructions, it may be configured to perform the process 300. In some embodiments, the process 300 may be executed by a first module. For example, the process 300 may be implemented by the verification data capturing device 134. As another example, the process 300 may be implemented by the controller 132. The operations of the illustrated process presented below are intended to be illustrative. In some embodiments, the process 300 may be accomplished with one or more additional operations not described and/or without one or more of the operations discussed. Additionally, the order in which the operations of the process as illustrated in FIG. 3 and described below is not intended to be limiting.

In 310, a first module may obtain a first packet. In some embodiments, the first packet may be a data packet. For example, the first packet may include a first random code, first data, a first signature, or the like, or any combination thereof. In some embodiments, the first random code may be a random number. In some embodiments, the first data may include data to be transmitted. In some embodiments, the first signature may be generated by the second module by encryption based on an original random code and original data.

Figure 4:
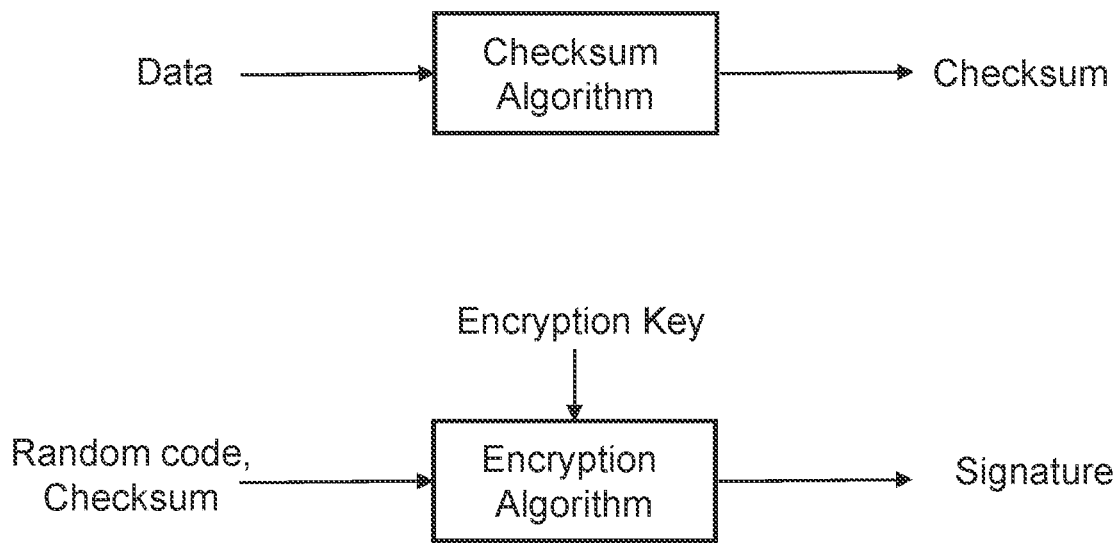
FIG. 4 is a schematic diagram illustrating an exemplary process for determining a signature according to some embodiments of the present disclosure.

FIG. 4 is a schematic diagram illustrating an exemplary process for determining a signature according to some embodiments of the present disclosure. For example, as shown in FIG. 4, the first signature may be generated by encrypting, according to an encryption algorithm, the original random code and a checksum of the original data using a first encryption key pre-stored in the second module. In some embodiments, the encryption algorithm may include an advanced encryption standard (AES), a data encryption standard (DES), a triple DES (3DES), or the like, or any combination thereof. In some embodiments, the first encryption key may be pre-stored in the second module. In some embodiments, the checksum of the original data may be a number representing a sum of the original data. For example, the checksum may be represented as a hexadecimal number. In some embodiments, as shown in FIG. 4, the checksum of the original data may be determined according to a checksum algorithm. For example, the checksum algorithm may include a cyclic redundancy check (CRC) algorithm, an exclusive or operation, or the like, or any combination thereof. In some embodiments, the original random code and the original data may be originally generated by the second module and sent from the second module. For example, the original random code may be a random number generated by a random generator of the second module. In some embodiments, the original data may include original data to be transmitted. During a data transmission, if the original data and/or the original random code sent from the second module is not tampered or fabricated, the first data may match the original data, and the original random code may match the first random code. As used herein, that two data sets match, e.g., the first data matching the original data, indicates that the two data sets satisfy a matching condition. Exemplary matching conditions may include that two data sets are identical, that two data sets are complementary to each other, two data sets have a certain degree of similarity, etc.

In some embodiments, the first module may include the verification data capturing device 134 or the controller 132. For example, the first module may be the verification data capturing device 134, and the second module may be the controller 132. The first packet may include a command packet, and the first data may include command data. As another example, the first module may be the controller 132, and the second module may be the verification data capturing device 134. The first packet may include a response packet, and the first data may include response data. In some embodiments, the response packet may be generated by the controller 132 after the controller 132 determines whether the command packet is transmitted securely. The first random code in the response packet may be generated based on the command packet.

In 320, the first module may generate a second signature by encryption based on the first random code and a checksum of the first data.

In some embodiments, the second signature may be generated by encrypting, according to an encryption algorithm, the first random code and the checksum of the first data using a second encryption key pre-stored in the first module. In some embodiments, the encryption algorithm may include an advanced encryption standard (AES), a data encryption standard (DES), a triple DES (3DES), or the like, or any combination thereof. In some embodiments, the second encryption key may be pre-stored in the first module. In some embodiments, if the first module is operably connected to the second module, the first encryption key pre-stored in the second module may be complementary or the same as the second encryption key pre-stored in the first module. For example, if the original data and/or the original random code sent from the second module is not tampered or fabricated, the first data may match the original data, and the first random code may match the original random code. The first signature and the second signature generated by encrypting the matching data and the matching random code according to the matching encryption key may match. In some embodiments, the checksum of the first data may be a number representing a sum of the first data. For example, the checksum may be represented as a hexadecimal number, a binary number, an octonary number, a decimal number, or the like, or any combination thereof. In some embodiments, the checksum of the first data may be determined according to a checksum algorithm, such as a cyclic redundancy check (CRC) algorithm, an exclusive or operation, or the like, or any combination thereof.

Figure 5:
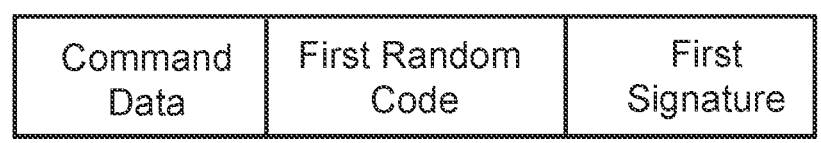
FIG. 5 is a schematic diagram illustrating an exemplary command packet according to some embodiments of the present disclosure.

In some embodiments, the first module may be the verification data capturing device 134, and the second module may be the controller 132. The verification data capturing device 134 may obtain the command packet from the controller 132. FIG. 5 is a schematic diagram illustrating an exemplary command packet according to some embodiments of the present disclosure. As shown in FIG. 5, the command packet may include the command data, the first random code, and the first signature. If the command data and/or the first random code is not tampered or fabricated, the first signature may be generated by the controller 132 by encrypting a checksum of the command data and the first random code according to the first encryption key pre-stored in the controller 132. The controller 132 may send the command packet to the verification data capturing device 134. The verification data capturing device 134 may obtain the command packet, and generate the second signature by encrypting the checksum of the command data and the first random code according to the second encryption key pre-stored in the verification data capturing device 134. If the command data and/or the first random code is not tampered or fabricated, the second signature may match the first signature. As used herein, that two data sets match, e.g., the first signature matching the second signature, indicates that the two data sets satisfy a matching condition. Exemplary matching conditions may include that two data sets are identical, that two data sets are complementary to each other, two data sets have a certain degree of similarity, etc.

In some embodiments, the first module may be the controller 132, and the second module may be the verification data capturing device 134. The controller 132 may obtain the response packet from the verification data capturing device 134. The response packet may include the response data, the first random code, and the first signature. If the response data and/or the first random code is not tampered or fabricated, the first signature may be generated by the verification data capturing device 134 by encrypting a checksum of the response data and the first random code according to the first encryption key pre-stored in the verification data capturing device 134. The verification data capturing device 134 may send the response packet to the controller 132. The controller 132 may obtain the response packet, and generate the second signature by encrypting the checksum of the response data and the first random code according to the second encryption key pre-stored in the controller 132. If the response data and/or the first random code is not tampered or fabricated, the second signature may match the first signature. For example, the first signature and the second signature may satisfy a matching condition. Exemplary matching conditions may include that the first signature and the second signature are identical, that the first signature and the second signature are complementary to each other, the first signature and the second signature have a certain degree of similarity, etc.

In some embodiments, before the controller 132 obtains the response packet from the verification data capturing device 134, the controller 132 may generate and send a command packet to the verification data capturing device 134. For example, the controller 132 may generate the command packet including a random code, command data, and a signature. The signature may be generated by encrypting the random code and a checksum of the command data using the second encryption key pre-stored in the controller 132 according to an encrypting algorithm. The controller 132 may transmit the command packet to the verification data capturing device 134, and obtain a response from the verification data capturing device 134. In the response, the verification data capturing device 134 may generate a signature by encrypting a checksum of the obtained command data and the obtained random code. In some embodiments, the response may be generated by the verification data capturing device 134 upon determining whether the generated signature in the response matches the signature in the command packet.

In 330, the first module may generate a first response to the first packet upon determining whether the second signature matches the first signature.

In some embodiments, the first module may determine whether the second signature matches the first signature. For example, if the second signature is the same as the first signature, the first module may determine that the first packet is transmitted securely. As another example, if the second signature satisfies a condition associated with the first signature, the first module may determine that the first packet is transmitted securely. For example, if the second signature has a certain degree of similarity with the first signature, the first module may determine that the first packet is transmitted securely. The first module may generate the first response. For example, the first response may describe that the first packet is transmitted securely. As another example, the first response may include an instruction that the first module sends to the second module. For example, the first module may instruct the second module to input biologic data, to perform a further operation, etc.

Figure 6:
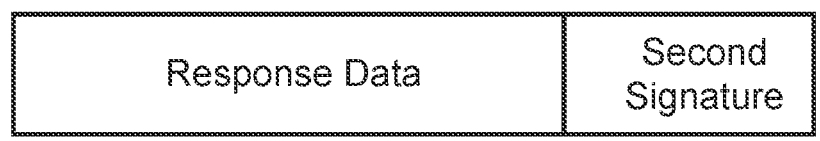
FIG. 6 is a schematic diagram illustrating an exemplary response packet according to some embodiments of the present disclosure.

In some embodiments, the first response may include a response packet. FIG. 6 is a schematic diagram illustrating an exemplary response packet according to some embodiments of the present disclosure. For example, as shown in FIG. 6, the response packet may include response data and the second signature. In some embodiments, when the response packet is transmitted to the second module, the response packet may include a second random code, response data, and a third signature. In some embodiments, the third signature may be generated by encryption based on the second random code and a checksum of the response data. For example, the third signature may be generated by encrypting the second random code and the checksum of the response data according to the second encryption key pre-stored in the first module. In some embodiments, the process for transmitting the response packet may be the same as process 300 described in FIG. 3 in the present disclosure.

In some embodiments, if the first module determines that the second signature does not match the first signature, the first module may generate the first response describing that the first packet is tampered, fabricated, or otherwise not transmitted securely, and send the first response to the second module. For example, the first module may report an error to the second module. As another example, the first module may send an alert or a warning to the second module.

In some embodiments, the verification data capturing device 134 may verify whether a command packet sent from the controller 132 is transmitted securely. The controller 132 may also verify whether a response packet sent from the verification data capturing device 134 is transmitted securely. The data is processed and verified at both the verification data capturing device 134 and the controller 132. The controller 132 and the verification data capturing device 134 may be equipped with only an encryption module, rather than both an encryption module and a decryption module. The data between the verification data capturing device 134 and the controller 132 is not transmitted by plaintext. Secure transmissions may be achieved at low hardware costs.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 300. It should be noted that any data between the verification data capturing device 134 and the controller 132 may be transmitted according to the process 300. During every transmission, a new random code may be generated at a sending terminal.

In some embodiments, after determining whether the data is transmitted securely according to process 300, the first module may further determine whether the data is tampered or fabricated during a transmission according to process 700.

Figure 7:
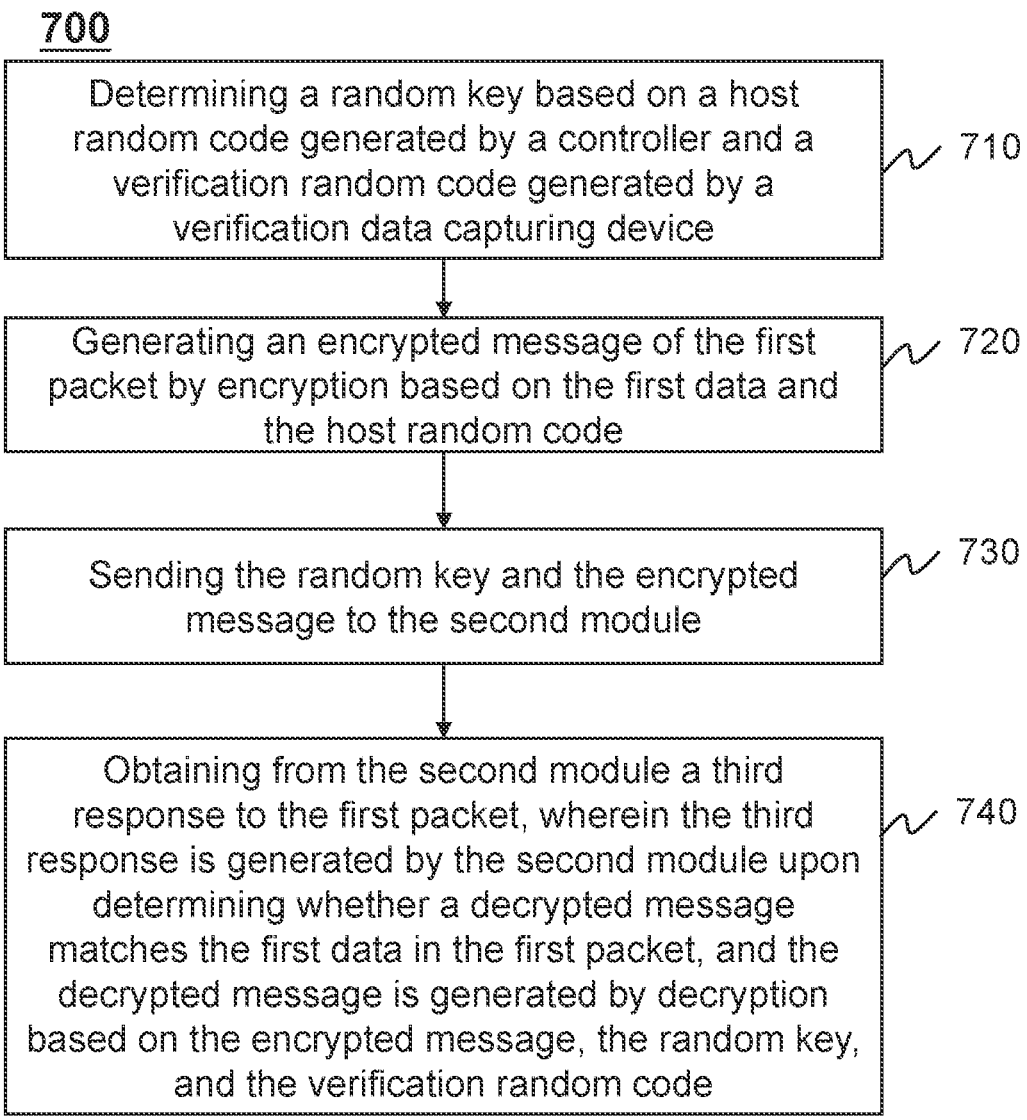
FIG. 7 is a flowchart illustrating an exemplary process for transmitting data according to some embodiments of the present disclosure.

FIG. 7 is a flowchart illustrating an exemplary process 700 for transmitting data according to some embodiments of the present disclosure. In some embodiments, the process 700 may be executed by the system 100. For example, the process 700 may be implemented as a set of instructions (e.g., an application) stored in a storage of the system 100 (e.g., the storage 140). The system 100 may execute the set of instructions, and when executing the instructions, it may be configured to perform the process 700. In some embodiments, the process 700 may be executed by the first module. For example, the process 700 may be implemented by the verification data capturing device 134. As another example, the process 700 may be implemented by the controller 132. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, the first module may determine a random key based on a host random code generated by the controller 132 and a verification random code generated by the verification data capturing device 134.

In some embodiments, the random key may be a random component of the first packet. In some embodiments, the host random code may be a random number generated at the controller 132. For example, the host random code may be generated by a random code generator 212 of the controller 132. In some embodiments, the verification random code may be a random number generated at the verification data capturing device 134. For example, the verification random code may be generated by a random code generator 218 of the verification data capturing device 134.

In some embodiments, the random key may be generated based on the host random code and the verification random code. For example, the first module may perform a logic operation on the host random code and the verification random code to obtain a logic operation result. In some embodiments, the logic operation may include an exclusive or operation, a cyclic redundancy check (CRC) algorithm, or the like, or any combination thereof. For example, the host random code is 1101, the verification random code is 0110, and the logic operation is the exclusive or operation. The random key may be generated by determining an exclusive or result of 1101 (the host random code) and 0110 (the verification random code). The exclusive or result may be 1011, and 1011 may be designated as the random key. The first module may encrypt the logic operation result by an encryption algorithm to generate the random key. In some embodiments, the encryption algorithm may include an advanced encryption standard (AES), a data encryption standard (DES), a triple DES (3DES), an AES 128 algorithm, or the like, or any combination thereof. For example, the random key may be generated by encrypting an exclusive or result of the host random code and the verification random code using a second encryption key pre-stored in the first module according to the advanced encryption standard (AES).

In 720, the first module may generate an encrypted message of the first packet by encryption based on the first data and the host random code.

In some embodiments, the encrypted message may be an encryption component of the first packet. In some embodiments, the first module may encrypt the first data using the host random code according to an encryption algorithm to obtain the encrypted message. In some embodiments, the encryption algorithm may include an advanced encryption standard (AES), a data encryption standard (DES), a triple DES (3DES), an AES 128 algorithm, or the like, or any combination thereof.

In 730, the first module may send the random key and the encryption message to the second module.

In some embodiments, the second module may obtain the random key and the encryption message from the first module. The second module may generate a third response to the first packet. In some embodiments, the second module may generate a decrypted message by decryption based on the encrypted message, the random key, and the verification random code. For example, the second module may determine a logic operation result of the host random code and the verification random code using the first encryption key pre-stored in the second module according to a decryption algorithm. In some embodiments, the decryption algorithm may include an advanced encryption standard (AES), a data encryption standard (DES), a triple DES (3DES), an AES 128 algorithm, or the like, or any combination thereof. In some embodiments, the second module may determine the host random based on the logic operation result of the host random code and the verification random code and the biological random. For example, the second module may perform a logic operation on the logic operation result and the biological random. In some embodiments, the logic operation may include an exclusive or operation, a cyclic redundancy check (CRC) algorithm, or the like, or any combination thereof. In some embodiments, the logic operation used at the second module may be the same as that used in the first module. In some embodiments, the second module may decrypt the encrypted message using the host random code according to a decryption algorithm. In some embodiments, the decryption algorithm may include an advanced encryption standard (AES), a data encryption standard (DES), a triple DES (3DES), an AES 128 algorithm, or the like, or any combination thereof. In some embodiments, the decryption algorithm used in the second module may be the same as the encryption algorithm used in the first module.

In some embodiments, the third response may be generated upon determining whether the decrypted message matches the first data in the first packet. In some embodiments, the second module may compare the decrypted message with the first data, and generate the third response upon the comparison result. In some embodiments, the second module may send the third response to the first module.

In 740, the first module may obtain the third response to the first packet from the second module.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 700.

Figure 8:
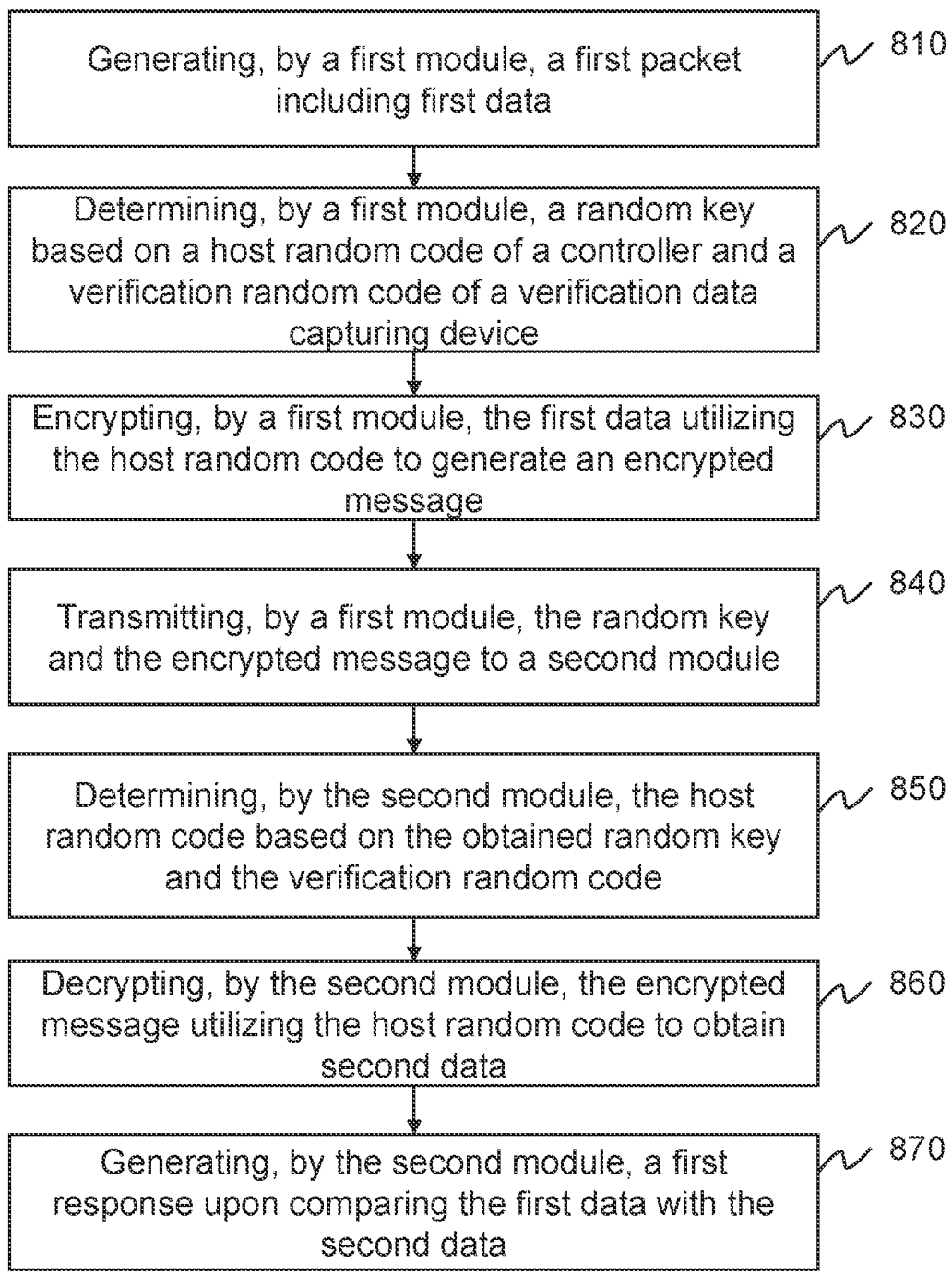
FIG. 8 is a flowchart illustrating an exemplary process for transmitting data according to some embodiments of the present disclosure.

FIG. 8 is a flowchart illustrating an exemplary process 800 for transmitting data according to some embodiments of the present disclosure. The process 800 may be executed by the system 100. For example, the process 800 may be implemented as a set of instructions (e.g., an application) stored in a storage of the system 100 (e.g., the storage 140). The system 100 may execute the set of instructions, and when executing the instructions, it may be configured to perform the process 800. In some embodiments, the process 800 may be executed by the first module and the second module. For example, some operations in the process 800 are executed by the first module, and other operations in the process 800 are executed by the second module. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting.

In 810, the first module may generate a first packet including first data.

In some embodiments, the first module may include the controller 132. The first packet may include a command packet, and the first data may include command data. In some embodiments, the first data may be represented as plaintext.

In 820, the first module may determine a random key based on a host random code of the controller 132 and a verification random code of the verification data capturing device 134.

In some embodiments, the random key may be a random component of the first packet. In some embodiments, the host random code may be a random number generated at the controller 132. For example, the host random code may be generated by a random code generator 212 of the controller 132. In some embodiments, the verification random code may be a random number generated at the verification data capturing device 134. For example, the verification random code may be generated by a random code generator 218 of the verification data capturing device 134.

In some embodiments, before transmitting data, the controller 132 may initialize the verification data capturing device 134. The verification data capturing device 134 may send an initialized packet including the verification random code to the controller 132. The controller 132 may store the verification random code, and generate the host random code.

In some embodiments, the random key may be generated based on the host random code and the verification random code. For example, the first module may perform a logic operation on the host random code and the verification random code to obtain a logic operation result. In some embodiments, the logic operation may include an exclusive or operation, a cyclic redundancy check (CRC) algorithm, or the like, or any combination thereof. For example, the host random code is 1101, the verification random code is 0110, and the logic operation is the exclusive or operation. The random key may be generated by determining an exclusive or result of 1101 (the host random code) and 0110 (the verification random code). The exclusive or result may be 1011, and 1011 may be designated as the random key. The first module may encrypt the logic operation result by an encryption algorithm to generate the random key. In some embodiments, the encryption algorithm may include an advanced encryption standard (AES), a data encryption standard (DES), a triple DES (3DES), an AES 128 algorithm, or the like, or any combination thereof. For example, the random key may be generated by encrypting an exclusive or result of the host random code and the verification random code using a second encryption key pre-stored in the first module according to the advanced encryption standard (AES).

In 830, the first module may encrypt the first data utilizing the host random code to generate an encrypted message.

In some embodiments, the encrypted message may be an encryption component of the first packet. In some embodiments, the first module may encrypt the first data using the host random code according to an encryption algorithm to obtain the encrypted message. In some embodiments, the encryption algorithm may include an advanced encryption standard (AES), a data encryption standard (DES), a triple DES (3DES), an AES 128 algorithm, or the like, or any combination thereof.

In 840, the first module may transmit the random key and the encrypted message to a second module.

In some embodiments, the second module may be the verification data capturing device 134.

In 850, the second module may determine the host random code based on the obtained random key and the verification random code.

In some embodiments, the second module may obtain the random key and the encrypted message. In some embodiments, the second module may firstly determine a logic operation result of the host random code and the verification random code using the first encryption key pre-stored in the second module according to a decryption algorithm. In some embodiments, the decryption algorithm may include an advanced encryption standard (AES), a data encryption standard (DES), a triple DES (3DES), an AES 128 algorithm, or the like, or any combination thereof. In some embodiments, the second module may secondly determine the host random based on the logic operation result of the host random code and the verification random code and the biological random. For example, the second module may perform a logic operation on the logic operation result and the biological random to obtain the host random. In some embodiments, the logic operation may include an exclusive or operation, a cyclic redundancy check (CRC) algorithm, or the like, or any combination thereof. In some embodiments, the logic operation used at the second module may be the same as that used at the first module.

In 860, the second module may decrypt the encrypted message utilizing the host random code to obtain second date.

In some embodiments, the second module may decrypt the encrypted message using the host random code according to a decryption algorithm to obtain the second data. In some embodiments, the decryption algorithm may include an advanced encryption standard (AES), a data encryption standard (DES), a triple DES (3DES), an AES 128 algorithm, or the like, or any combination thereof. In some embodiments, the decryption algorithm used in the second module may be the same as the encryption algorithm used in the first module. In some embodiments, the second data may be decrypted data or plaintext.

In 870, the second module may generate a response upon comparing the first data and the second data.

In some embodiments, the second module may compare the second data with the first data, and generate the response upon the comparison result. In some embodiments, the second module may send the response to the first module. In some embodiments, the response may be transmitted according to the process 800 in the present disclosure. It should be noted that the host random code and the verification random code may be updated in every data transmission.

In some embodiments, if the first data sent from the first module is not tampered or fabricated, the first data may be firstly encrypted and then decrypted using the same encryption key (i.e., the first encryption key pre-stored in the second module and the second encryption key pre-stored in the first module are complementary or the same when the first module is operably connected to the second module). The second data and the first data may satisfy a matching condition. Exemplary matching conditions may include that the first data and the second data are identical, the first data and the second data are complementary to each other, the first data and the second data have a certain degree of similarity, etc.

In some embodiments, the controller 132 and the verification data capturing device 134 may generate a random code, respectively. The data is processed and verified at both the verification data capturing device 134 and the controller 132. The data between the verification data capturing device 134 and the controller 132 is not transmitted by plaintext. Secure transmission is achieved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 800.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising: at least one storage device including a set of instructions for transmitting data; and at least one processor in communication with the storage device, wherein when executing the set of instructions, the at least one processor is directed to cause the system to perform operations including: obtaining, by a first module, a first packet, wherein the first packet includes a first random code, first data, and a first signature; wherein the first module includes a controller configured to verify the first packet from a second module, the second module includes a verification data capturing device configured to capture verification data and generate and send the first packet to the controller, the first packet includes a second response packet, and the first data includes second response data; generating, by the first module, a second signature by encryption based on the first random code and a checksum of the first data; and generating, by the first module, a first response to the first packet upon determining whether the second signature matches the first signature, wherein the generating a first response to the first packet upon determining whether the second signature matches the first signature includes: in response to determining that the second signature matches the first signature, generating a response packet including a second random code, response data, and a third signature, wherein the third signature is generated by encryption based on the second random code and a checksum of the response data.

2. The system of claim 1, wherein the first signature is generated by the second module by encryption based on an original random code and original data.

3. The system of claim 2, wherein the first module or the second module includes a verification data capturing device configured to capture verification data.

4. The system of claim 3, wherein the verification data capturing device includes at least one of: a fingerprint capturing device, a voice capturing device, a retina capturing device, an iris capturing device, a face capturing device, a vein capturing device, or a palm print capturing device.

5. The system of claim 2, wherein
the first module includes a verification data capturing device configured to capture verification data,
the second module includes a controller configured to generate and send the first packet to the verification data capturing device,
the first packet includes a command packet, and
the first data includes command data.

6. The system of claim 2, wherein the first random code is generated based on a command packet associated with the second response packet.

7. The system of claim 6, wherein before obtaining the first packet, the at least one processor is further directed to cause the system to perform the operations including:
generating, by the controller, the command packet including a third random code, command data, and a fourth signature;
transmitting the command packet to the verification data capturing device; and
obtaining, by the controller, a second response from the verification data capturing device, wherein the second response is generated by the verification data capturing device upon determining whether a fifth signature matches the fourth signature, and the fifth signature is generated by the verification data capturing device by encryption based on the command data and the third random code.

8. The system of claim 2, wherein the first module is electrically connected to the second module or the first module is connected to the second module via a wireless network.

9. The system of claim 1, wherein the first random code is a host random code generated by a controller, and the at least one processor is further directed to causing the system to perform the operations including:
determining, by the first module, a random key based on the host random code and a verification random code generated by a verification data capturing device;
generating, by the first module, an encrypted message of the first packet by encryption based on the first data and the host random code; and
sending, by the first module, the random key and the encrypted message to the second module.

10. The system of claim 9, wherein the at least one processor is further directed to cause the system to perform the operations including:
obtaining from the second module a third response to the first packet, wherein the third response is generated by the second module upon determining whether a decrypted message matches the first data in the first packet, and the decrypted message is generated by decryption based on the encrypted message, the random key, and the verification random code.

11. A method comprising: obtaining, by a first module, a first packet, wherein the first packet includes a first random code, first data, and a first signature; generating, by the first module, a second signature by encryption based on the first random code and a checksum of the first data; wherein the first module includes a controller configured to verify the first packet from the second module, the second module includes a verification data capturing device configured to capture verification data and generate and send the first packet to the controller, the first packet includes a second response packet, and the first data includes second response data; and generating, by the first module, a first response to the first packet upon determining whether the second signature matches the first signature, wherein the generating a first response to the first packet upon determining whether the second signature matches the first signature includes: in response to determining that the second signature matches the first signature, generating a response packet including a second random code, response data, and a third signature, wherein the third signature is generated by encryption based on the second random code and a checksum of the response data.

12. The method of claim 11, wherein the first signature is generated by the second module by encryption based on an original random code and original data.

13. The method of claim 12, wherein the first module or the second module includes a verification data capturing device configured to capture verification data.

14. The method of claim 13, wherein the verification data capturing device includes at least one of: a fingerprint capturing device, a voice capturing device, a retina capturing device, an iris capturing device, a face capturing device, a vein capturing device, or a palm print capturing device.

15. The method of claim 12, wherein
the first module includes a verification data capturing device configured to capture verification data,
the second module includes a controller configured to generate and send the first packet to the verification data capturing device,
the first packet includes a command packet, and
the first data includes command data.

16. The method of claim 12, wherein the first random code is generated based on a command packet associated with the second response packet.

17. The method of claim 16, wherein before obtaining the first packet, the at least one processor is further directed to cause the system to perform the operations including:
generating, by the controller, the command packet including a third random code; command data, and a fourth signature;
transmitting the command packet to the verification data capturing device; and
obtaining, by the controller, a second response from the verification data capturing device, wherein the second response is generated by the verification data capturing device upon determining whether a fifth signature matches the fourth signature, and the fifth signature is generated by the verification data capturing device by encryption based on the command data and the third random code.

18. The method of claim 12, wherein the first module is electrically connected to the second module or the first module is connected to the second module via a wireless network.

* * * * *